United States Patent [19]
Watras

[11] Patent Number: 5,277,952
[45] Date of Patent: Jan. 11, 1994

[54] DECORATIVE CRACKED GLASS MIRROR TILE AND METHOD

[76] Inventor: Edward W. Watras, Post Office Drawer P, Deer Park, N.Y. 11729

[21] Appl. No.: 921,938

[22] Filed: Jul. 29, 1992

[51] Int. Cl.$^5$ .............................................. B32B 3/10
[52] U.S. Cl. .................................... 428/46; 428/49; 428/155; 428/912.2; 428/15
[58] Field of Search ............. 428/99, 142, 155, 912.2, 428/46, 49; 52/309.3, 309.14, 309.15

[56] References Cited

U.S. PATENT DOCUMENTS 2,887,806  5/1959  Hassett ................................ 428/155
4,990,407  2/1991  Watras ................................ 428/426

*Primary Examiner*—Alexander S. Thomas
*Attorney, Agent, or Firm*—Robert S. Stoll

[57] ABSTRACT

Construction and method of making a decorative cracked glass laminate in tile, panel, sheet, plate, veneer or in situ form. It comprises three layers laminated together, an inner backing layer, a substantially light-transparent outer layer, and a decoratively cracked glass intermediate layer sandwiched between the inner and outer layers. The intermediate layer, preferably a mirror, is made of tempered glass and the outer layer is made of annealed glass. The laminate is made by laminating the inner and outer layers to the intermediate layer while it is in uncracked condition, and then causing it to crack in situ as by cutting into an exposed edge. Alternatively, the two glass layers may be laminated together and then laid in a backing material such as plastics which then forms the backing layer of the two-glass laminate.

13 Claims, 5 Drawing Sheets

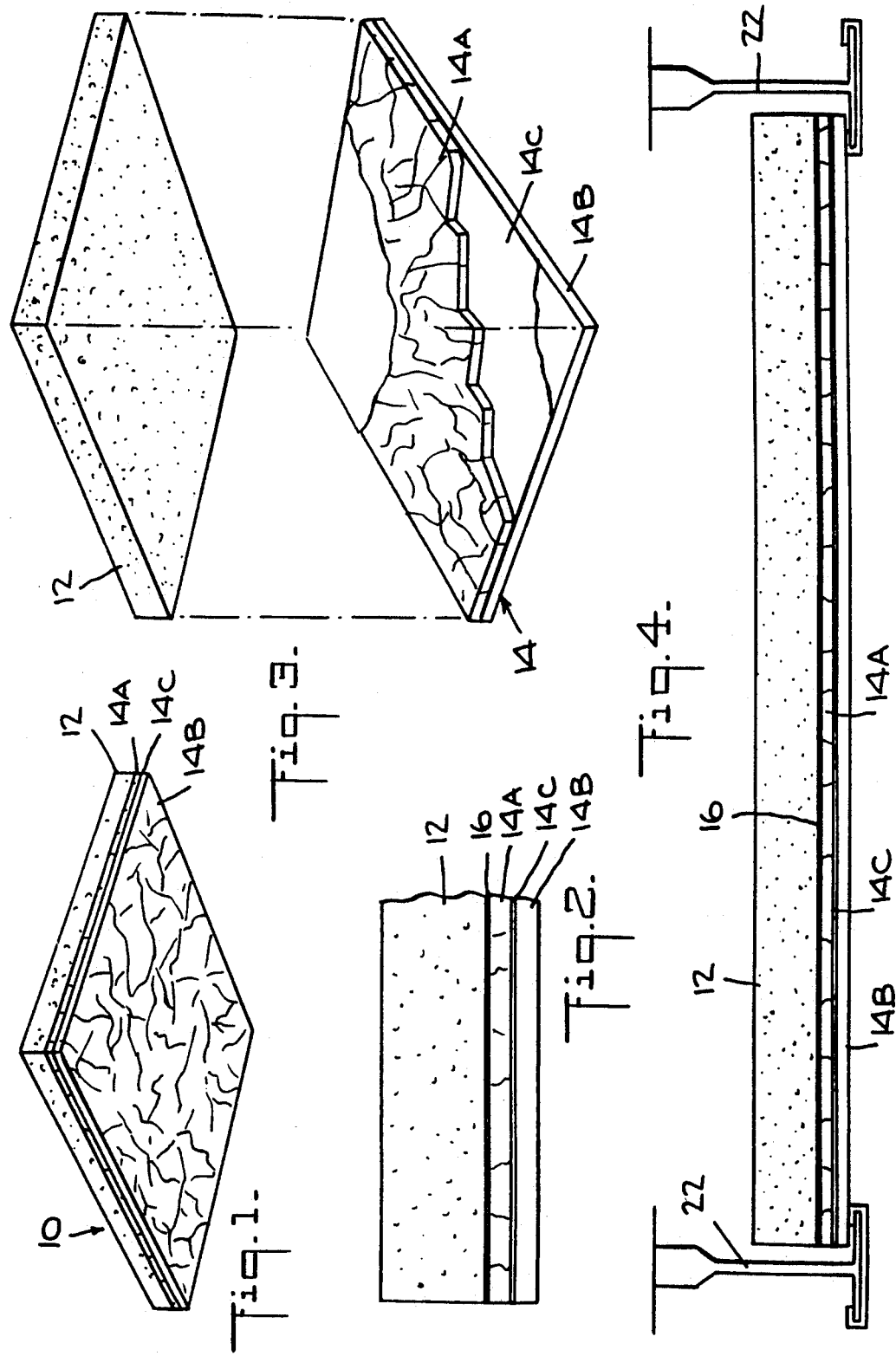

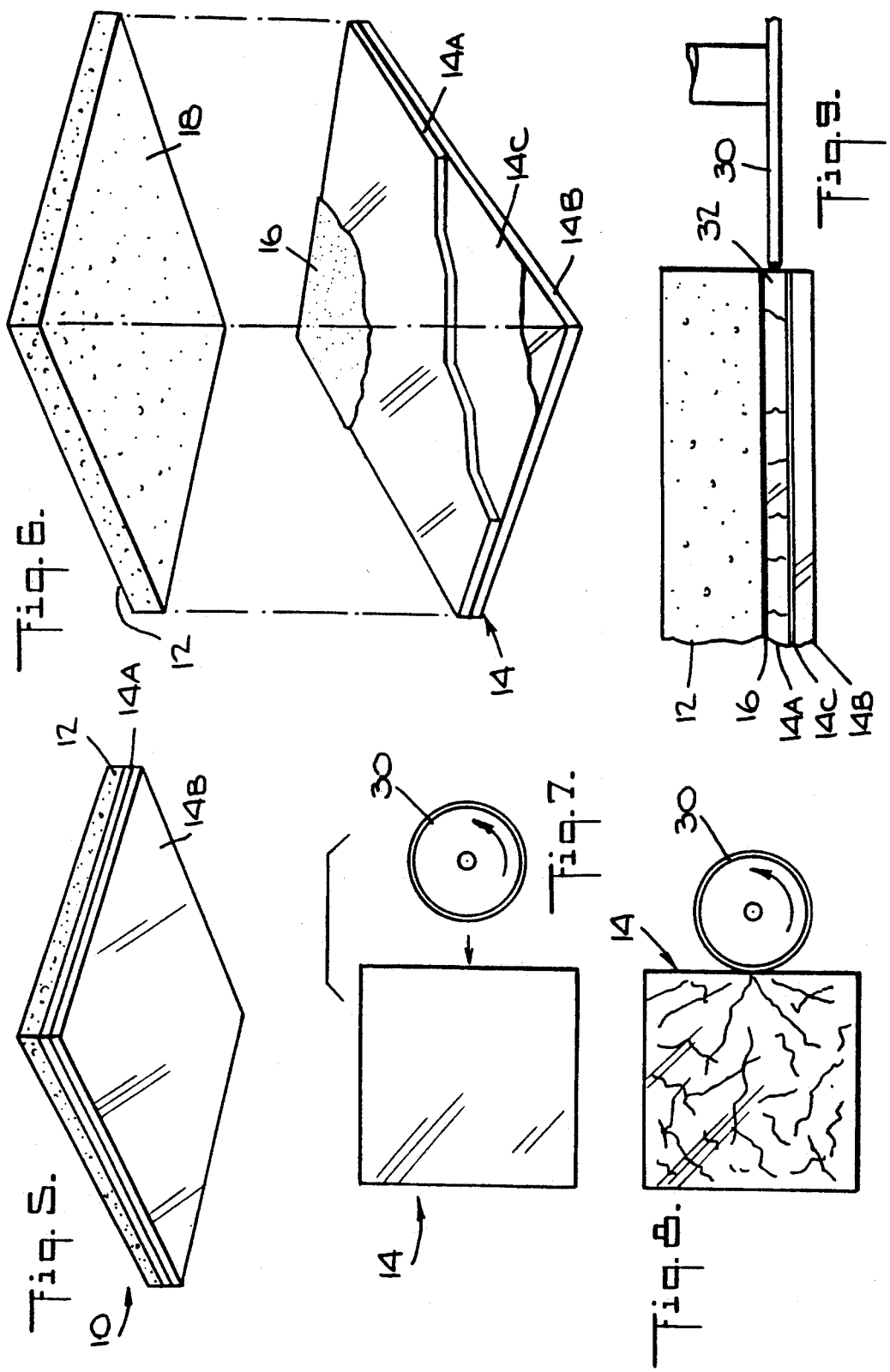

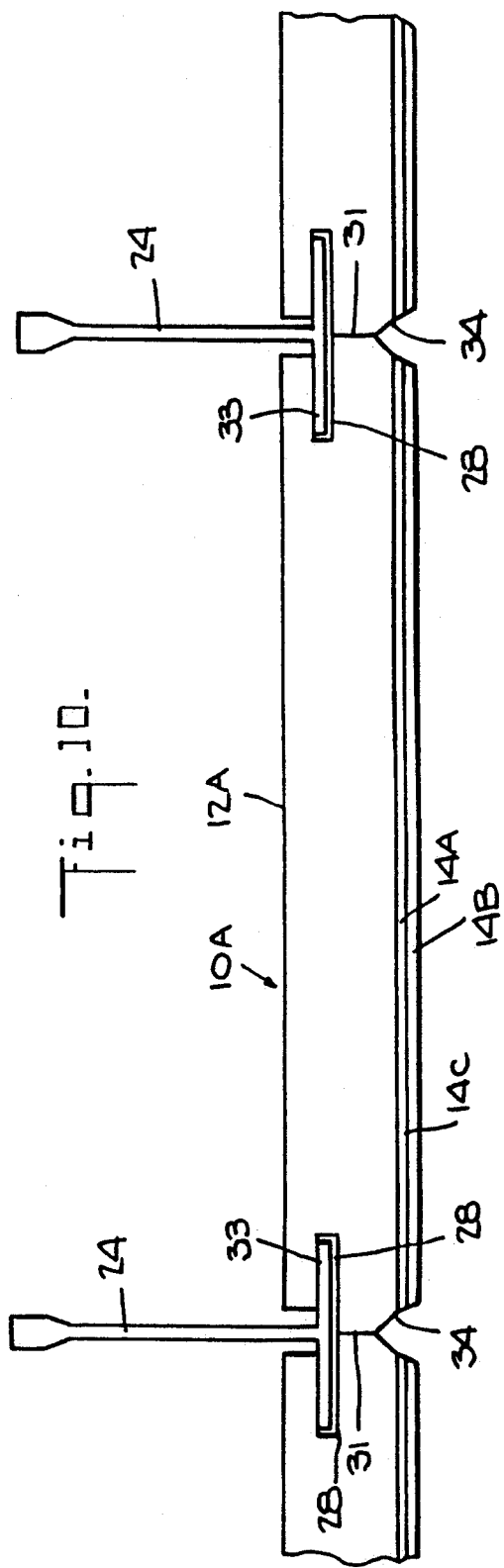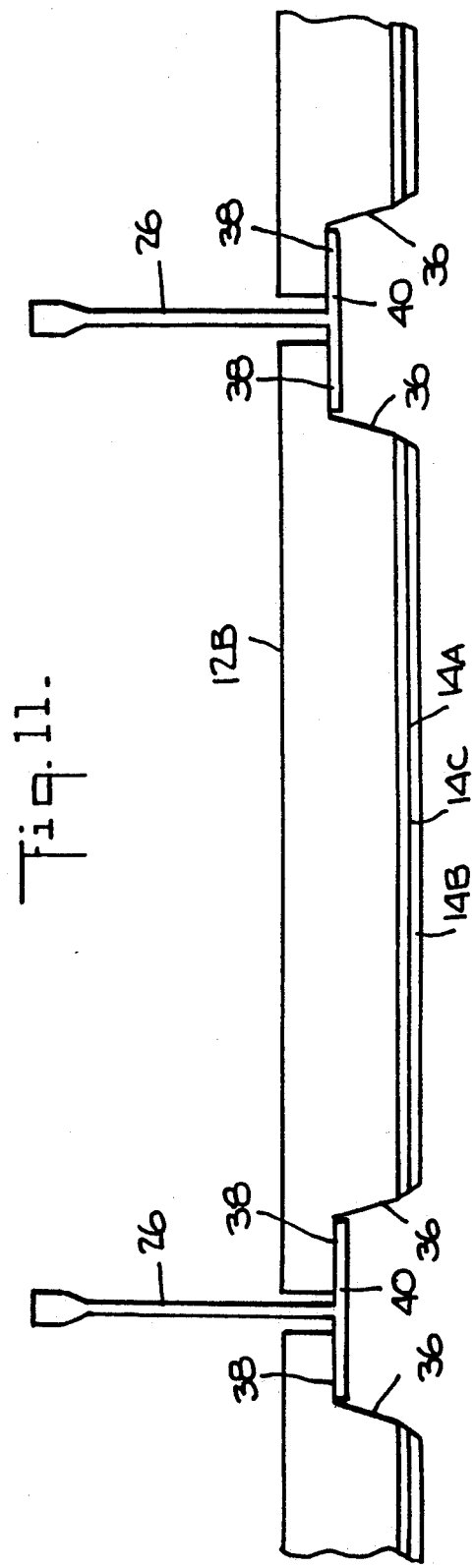

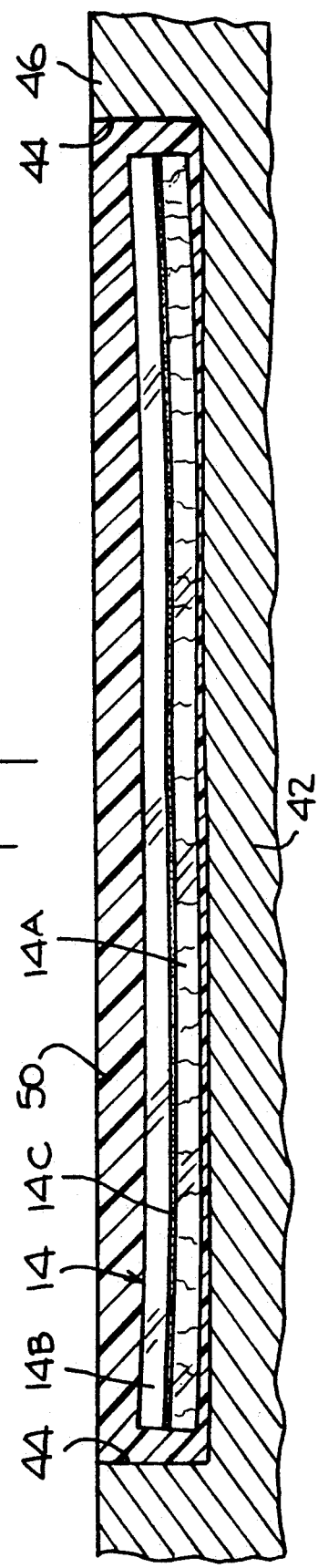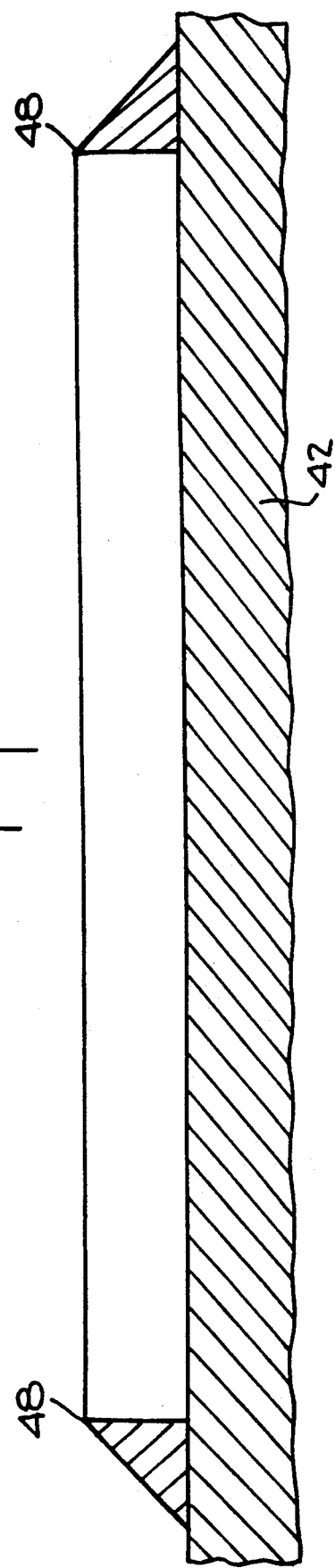

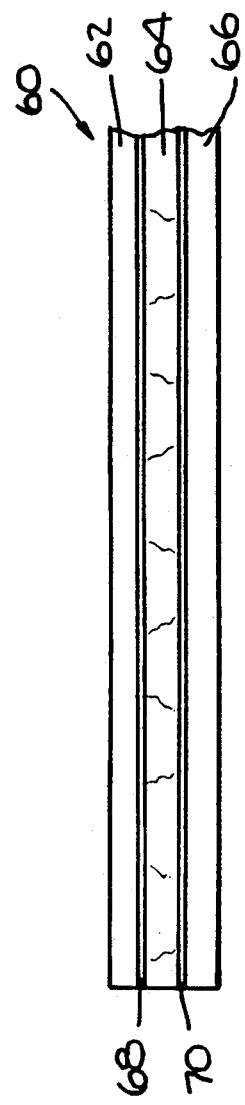
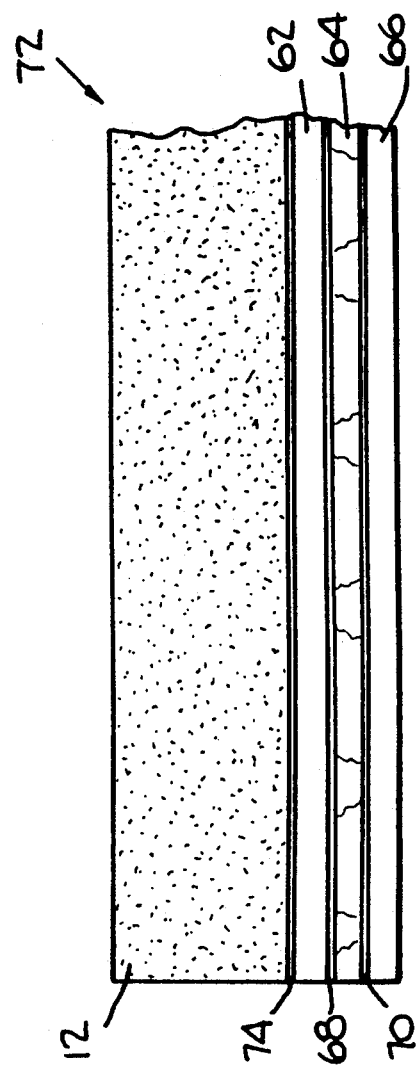
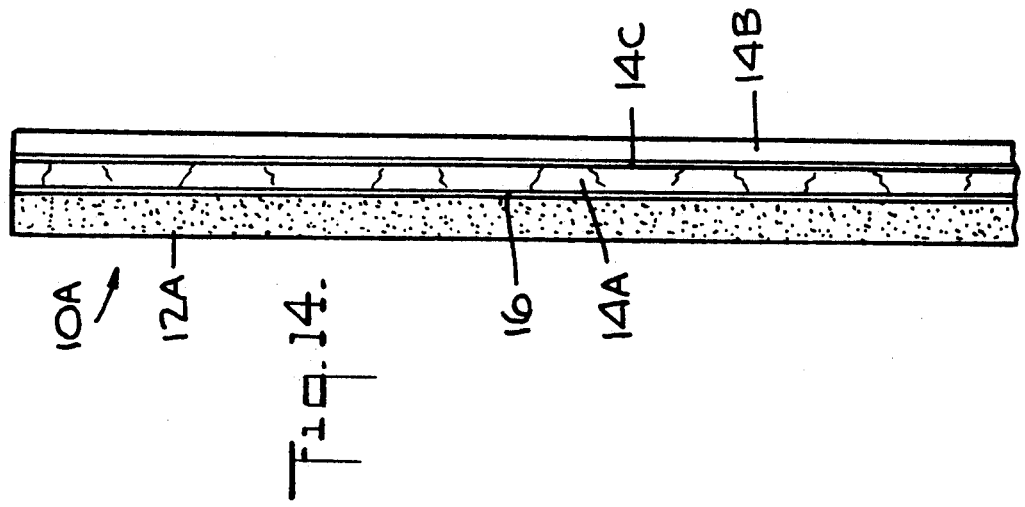

DECORATIVE CRACKED GLASS MIRROR TILE AND METHOD

REFERENCE TO RELATED DOCUMENTS

Reference is made to my U.S. Pat. No. 4,990,407, issued Feb. 5, 1991, and to Disclosure Document No. 197,611, filed Jul. 26, 1988 in connection therewith.

BACKGROUND OF THE INVENTION

Mirrored ceiling and wall surfaces are decoratively appealing, but prior to my U.S. Pat. No. 4,990,407 they presented structural and construction problems. As noted in that patent, if the mirror is to be glass, as is generally preferred, weight is a significant disadvantage, particularly in ceilings where it is difficult to handle large glass panels during installation and difficult to provide adequate structural support. Smaller glass mirrors, in the form or size of tiles, reduce the weight problem of each individual piece, but at least two significant problems remain. First, glass mirrors are not good acoustical absorbers, and therefore yield higher than necessary sound levels where used. Second, glass mirrors generally crack under heat and heretofore have been unacceptable where fire-resistant construction is desirable.

Another important objective of my earlier patent is personal safety. Conventional glass mirror installed in direct hung gridwork presents a possible safety hazard if impacted by a mop frame or other implement. In glass industry usage, a shatter-resistant mirror is the term used when a vinyl or other supporting sheet is adhesively secured to the back surface of a mirror, but such a structure helps to prevent shards of glass from falling from the mirror more than preventing the glass from shattering.

The overriding purpose of a mirror tile is decorative and my invention in my prior patent made mirror tiles constructed of glass safe and practical. As commercially sold under the names Image-Safe TM, Tru-Mirror TM and Island Reflections TM, trademarks of Inter-County Building Materials Corp. of Deer Park, Long Island, N.Y., such tiles have been approved under building codes and have received Underwriters Laboratories Inc. (U.L. ®) approval.

Notwithstanding the purpose of my prior invention to make glass tiles safer (resisting breakage but if accidentally broken, the glass fragments remain in place), there is decorative purpose in having glass mirror tiles which are intentionally cracked. There is great visual beauty in a well-silvered glass mirror which is intentionally cracked or crazed throughout. The present invention provides a structure and method of making such tiles, and providing them with adequate protection when installed.

But the invention has a broader use than the specific purpose above described. In its broad principle, the invention provides a decorative cracked glass laminate in various forms such as tiles, panels, sheets, plates, veneers and in situ applications. The intermediate layer of the laminate is a sheet of tempered glass mirror. This intermediate layer is laminated between a supportive or protective backing such as a fiberboard panel, and an outer (front) transparent sheet, e.g., a sheet of annealed glass. The intermediate tempered glass mirror is caused to crack from edge to edge by cutting into one edge, as by a rotating diamond-tipped blade.

The resulting laminate may be used as a ceiling tile, a floor tile, a wall decoration, a table or counter top, and various other applications.

SUMMARY OF THE INVENTION

The present invention accordingly provides a mirror construction which combines the visual advantages of an intentionally cracked glass mirror (distortionless reflected images, high resistance to discoloration due to aging or exposure to light or atmospheric attack) with none of the safety disadvantages of a conventional installation of glass and with high degrees of fire-resistance and acoustical absorption, in sizes and shapes adopted for ease of shipping, handling and installation.

To illustrate, the product of the present invention comprises a laminate of a glass mirror and a glass cover with a transparent adhesive laminating layer in between. The glass laminate is itself bonded to a support member, which for ceiling tile use is preferably a water-felted mineral fiberboard panel. The glass mirror layer is intentionally cracked or crazed in accordance with the method hereof for visual decorative purposes. Because the cracked mirror layer is sandwiched between the mineral fiberboard or other support and the uncracked glass cover, the otherwise sharp surface edges of the cracks are not exposed.

Alternatively, the intermediate layer may comprise a non-reflecting cracked glass sheet and the backing layer may comprises a mirror further backed, where needed, by a shock and heat retardant backing such as a mineral fiberboard.

For flooring use, the glass laminate is set in a polymer material, which flows around the laminate and then cures or hardens to encapsulate the laminate, thereby supporting and protecting the laminate.

A method of the present invention comprises (a) tempering a glass mirror, (b) annealing a glass sheet, (c) laminating the glass mirror to the glass sheet by means of a vinyl laminating layer, preferably polyvinylbutyral, (d) bonding the glass laminate of step (c) to a backing board, such as a water-felted mineral fiberboard panel, with the glass mirror being sandwiched between the backing board and the glass sheet, and (e) touching an exposed side edge of the glass mirror layer with a rotating diamond-tipped blade such as a rotary saw or grinding wheel to crack or craze that layer in situ.

BRIEF DESCRIPTION OF THE DRAWING

FIG. 1 is a perspective view of a cracked glass ceiling tile of the present invention.

FIG. 2 is an enlarged fragmentary side view of the cracked glass ceiling tile of the present invention.

FIG. 3 is an exploded view of the cracked glass ceiling tile of the present invention, showing the layers of the glass laminate partly broken away for clarity.

FIG. 4 is an edge view of the cracked glass ceiling tile of the present invention shown supported on hung gridwork.

FIG. 5 is a view similar to that of FIG. 1, but showing the glass mirror layer uncracked.

FIG. 6 is a view similar to that of FIG. 3, but showing the glass mirror layer uncracked.

FIG. 7 is a plan view of the cracked glass ceiling tile of the present invention with the rotating diamond-tipped blade in position to be applied to the glass mirror layer.

FIG. 8 is a view similar to that of FIG. 7 with the rotating blade touching a side edge of the glass mirror layer, causing the same to crack or craze.

FIG. 9 is an enlarged fragmentary side view of the cracked glass ceiling tile of the present invention showing the diamond-tipped rotating blade touching a side edge of the glass mirror layer, causing the same to crack or craze.

FIG. 10 shows the cracked glass ceiling tile of the present invention in a side view, supported by a concealed grid.

FIG. 11 shows the cracked glass ceiling tile of the present invention in side view, supported by a recessed exposed grid.

FIG. 12 is a fragmentary vertical section through an embodiment of the invention used for floor or countertop applications.

FIG. 13 is a fragmentary vertical section showing the use of a temporary dam to form a recess in a floor or counter-top for the decorative glass laminate and a pourable polymer which encapsulates the laminate and embeds in the recess.

FIG. 14 is a side edge view of a cracked glass wall tile or panel made in accordance with the present invention.

FIG. 15 is an edge view of another embodiment of the invention wherein the intermediate layer is a cracked non-reflecting glass sheet and the backing layer is a mirror.

FIG. 16 is a view similar to FIG. 15, but showing an additional backing applied to the mirror, said additional backing providing anti-shock and heat retarding properties.

DESCRIPTION OF A PREFERRED EMBODIMENT

Referring to the drawing, the ceiling tile composite 10 of the present invention is a decorative structural element comprising in bonded combination shock retardant means 12, for ceiling tile use, preferably mineral fiberboard, decorative means 14 and bonding means 16, preferably an adhesive, therebetween.

As indicated in my prior patent, mineral fiberboard 12 is preferably a water felted mineral composition acoustical ceiling panel having specific characteristics of at least one substantially planar but fissured surface 18, a minimum density of approximately one pound per square foot of area covered in order to comply with Underwriters Laboratories Inc. (U.L. Labs) classified acoustical material time design fire tests, and compliance with other fire ratings. The fissures on or in said surface 18 are preferably uniform and non-directional.

Acceptable commercially-available mineral fiberboards for use with the present invention are USG Auratone TM Firecode TM panels in Omni-Fissured pattern (United States Gypsum Company, Chicago, Ill.), Armstrong Minaboard TM FireGuard panels, Cortega pattern (Armstrong World Industries, Inc., Lancaster, Pa.) and Celotex TM Hytone ® Protectone TM panels, Mosaic or ND Fissuretone patterns (Celotex Building Products Division, The Celotex Corporation, Tampa, Fla.).

Decorative means 14 preferably comprises a glass mirror layer 14A, a glass cover layer 14B and laminating means 14C therebetween. Glass mirror layer 14A is preferably a double-thick decorative glass having a nominal thickness of ⅛ inch. Other thicknesses, or color-tinted glass, may be used depending on availability, application and desired decorative effect. Glass itself is non-combustible. In accordance with the present invention, the glass of glass mirror layer 14A is tempered, preferably full tempered and not just heat strengthened, as generally understood in the glass industry. Also in accordance with the present invention, the glass of glass cover layer 14B is annealed as generally understood in the glass industry. Tempered glass mirror layer 14A and annealed glass cover layer 14B are joined by an intermediate laminating means 14C which may be a transparent vinyl. The vinyl is either clear or color tinted as may be desired. polyvinyl butyral is a preferred material which fuses to the adjacent glass surfaces rather than having separate adhesives. A suitable commercially available polyvinylbuterol lamination resin is Staflex ® Opticolor ® from Monsanto, available in color. Alternatively, a liquid glass lamination resin may be used, such as Diacid/Glycol condensate with a methyl ethyl ketone peroxidecatalyst, with Organosilane ester (Gamma-Methacryloxypropyltrimethoxysilane) adhesion promoter. Such a resin is clear; transparent pigmentation may be added.

Decorative means 14 of the present invention thus far has two uncracked glass layers, tempered glass mirror layer 14A and annealed glass cover layer 14B, joined by intermediate laminating means 14C. The glass mirror 14A side of decorative means 14 in turn is bonded to mineral fiberboard 12 by bonding means 16 to form ceiling tile composite 10.

As indicated in my prior patent, bonding means 16 comprises an adhesive, preferably a rubber- or latex-base epoxy waterproof composition, which is non-flammable when fully cured and which is adapted for mirror use so as to be non-degradable with respect to the silvered or reflective side of the mirror. Suitable commercially available rubber base adhesives are Sta-Stuck ® Mirror Bond, Specialty Chemicals Company, Division of Continental Chemical and Coatings Corporation, Woburn, Mass., and Ultra/Bond ® Mirror Mastic, C. Gunther Company, Cary, Ill. Suitable latex base adhesives are Henry TM #430 non-flammable clear Thin-Spread adhesive, The W. W. Henry Company, Huntington Park, Calif., and Miracle TM clear set #420 floor tile adhesive Miracle Adhesives Corporation, Bellmore, Long Island, N.Y. A suitable epoxy-adhesive is Poly-Com Bond 2, a two-component epoxy structural adhesive available in liquid form (advantageous for high volume production) and in gel form (for trowel-spread low volume use) from Polymer Compounds, Hauppauge, Long Island, N.Y.

Rubber base adhesives are gun (cartridge) grade, and are suitable for low volume production. The application of this type of adhesive must follow a prescribed repeat pattern with a specific amount per course. Latex base adhesives are brush or roller grade, and are suitable for high volume production. Using a textured paint roller makes the application of the adhesive extremely easy, and the quantity of adhesive is not as critical.

Adhesive 16, when appropriately applied to bond mirror layer 14A to mineral fiberboard substrate 12, enters the fissures of fissured surface 18 of substrate 12 during application, curing or both. The strength of the resulting bond is thereby enhanced by reason of the increased surface area of substrate 12 to which adhesive 16 attaches. Moreover, substantially to the extent that adhesive 16 fills in what would otherwise be a void formed by a fissure against mirror 14A, there is also greater bonded surface area on the bonded side 20 of mirror 14A.

The method of the present invention is to cause the glass of tempered glass mirror 14A to crack or craze in situ, that is, in and as part of the composite 10 as described, by applying a spinning diamond tipped saw blade 30 to an exposed side edge 32 of glass mirror 14A. When the spinning blade cuts into side edge 32, glass mirror 14A cracks or crazes at or near the point of contact and the crack or craze that forms propagates substantially throughout that glass layer. Glass cover layer 14B, despite being adhesively laminated to glass mirror 14A, does not crack or craze, and acts as a protective cover.

When installed as a suspended ceiling tile element, ceiling tile composite 10 is intended to be supported by a suspension system having direct hung gridwork 22 of inverted T exposed double web design, such as shown in FIG. 4, having, as a minimum, ASTM classification for intermediate duty. As noted in my prior patent, when so supported ceiling tile composite 10 is in compression rather than in tension, aiding the permanence of the bond of adhesive 16.

It has been found, however, that the bond of adhesive 16 is strong enough to support the weight of decorative means 14, even though the bond is in tension. This makes available use of concealed gridwork 24 as shown in FIG. 10, and recessed gridwork 26 as shown in FIG. 11, both having decorative differences and advantages over the exposed gridwork 22 of FIG. 4. A mock-up of the embodiment shown in FIG. 4 has withstood 260 hours of vibration and 80 hours of grid shakes (destructive) testing without failure.

In the FIG. 10 embodiment, ceiling tile composite 10A comprises mineral fiberboard 12A having grooves 28 milled or otherwise formed in the side edges 30 thereof to receive, and be supported by the head 33 of the inverted T gridwork 24. Each head 32 is accordingly concealed from view and a ceiling made of ceiling tiles 10A would be smoother and more continuous. For further decorative purposes, as well as to functionally help prevent glass-edge chipping, the bottom edge of each tile 10A may be chamfered to form an exposed wedge-shaped gap 34 where tile meets tile. Gap 34 may be painted black for further decorative effect.

In the FIG. 11 embodiment, each mineral fiberboard 12B has an edge channel 36 to form, in side-by-side combination of ceiling tile composites 12B, recessed surfaces 38 for seating on and support by the head 40 of inverted T gridwork 26.

Ceiling tile composite 10 of the present invention accordingly provides long-lasting scratch-resistant decorative beauty of glass- mirrored ceilings and walls with structural and fire- retardant properties.

In typical dimension, ⅜-inch thick and nominal 2 feet by 2 feet or 2 feet by 4 feet panels (actual 23¾ , inches×23¾ inches and 23¾ inches×47¾ inches, respectively), ceiling tile composite 10 constructed and suspended as aforesaid is intended to comply with current Underwriters Laboratories Inc. classified acoustical material time design fire tests. In each of the FIGS. 10 and 11 embodiments, a class A tile, having lighter weight, has been found to be useful. Each tile has four lineal feet of support in typical sizes and installation, more than sufficient to support all hung weight.

Turning now to FIG. 14, it will be understood that panel or tile 10A shown therein comprises a relatively thin unit suited for wall panel or tile use. It comprises a thin backing such as a ⅛ inch fiberboard 12A, a tempered glass mirror 14A laminated to said fiberboard by means of adhesive 16, and an annealed glass sheet 14B laminated to said glass mirror by means of adhesive 14C. This wall tile or panel may be applied in conventional manner to an interior wall in a house or other building by means of an adhesive, or by any other conventional means. It may also be mounted in a picture frame or the like and hung on a wall in conventional manner.

Decorative means 14 may be used for floor or counter-top applications. In such use, a mineral fiberboard backing is not necessary. As shown in FIG. 12, the glass laminate forming decorative means 14 is set in a recess or cavity on a floor or counter-top 42. The recess may be formed by the side edges 44 of adjacent tiles or like members 46, or by a temporary dam 48 as shown in FIG. 13 and provided for the purpose. A pourable polymer 50 is poured into the recess or cavity, encapsulating the glass laminate decorative means 14 and embedding it in the recess. When solidified as by curing or drying, the polymer 50 forms the protective shock retardant means of the invention, referred to as 12 in the ceiling tile embodiment. In the present floor tile embodiment, polymer 50 is flowed over the top of the glass laminate, to the top level of the recess forming a continuous floor. Additionally, due to the lack of a structural element such as mineral fiberboard being bonded to the glass laminate, when glass mirror layer 14A is cracked or "blown", glass laminate 14 assumes a slight curvature, convex on the cracked layer 14A side. This being the side which is placed against floor or counter-top 42, there is a gap between laminate 14 and floor or counter-top 42, allowing polymer 50 to flow therebetween. Thus the encapsulation of laminate 14, with polymer 50 on all sides, top and bottom of the laminate.

While the preferred embodiment has a cracked glass mirror layer to provide protected decorative effect, it is within the scope of the invention to provide additional or different effects with the same laminate structure bonded to the mineral fiberboard structural element. For example, any or all of the layers of the decorative laminate means 14 may be colored, or translucent, or etched or printed with a pattern or design, or an additional layer may be added which contains some other design, portrayal or representation.

FIG. 15 shows another embodiment of the invention wherein laminate 60 comprises a mirror 62 which serves as both a reflector and a backing, a cracked glass sheet 64 and a glass cover sheet 66. Adhesive 68 bonds mirror 62 to cracked glass sheet 64, and adhesive 70 bonds cover sheet 66 to cracked glass sheet 64.

Laminate 72 shown in FIG. 16 corresponds to laminate 60 in FIG. 15 except for additional backing 1 which is bonded to mirror 62 by means of adhesive 74. This backing, as above described, provides shock resisting and heat retarding properties, and it is used where such properties are required.

In both embodiments (FIGS. 15 and 16) the mirror 62 is made of annealed glass, as is glass cover sheet 66. Cracked glass sheet 64 is made of tempered glass. As is the case of the embodiment of FIG. 2, when laminates 60 and 72 are each adhesively bonded, glass sheet 64 is intact until a rotating blade 30 or the like is applied to one of its edges. This causes it to crack from edge to edge.

For claim purposes, each layer of each laminate herein described and claimed is identified as a sheet, regardless of its thickness.

I claim:

1. A decorative laminate, comprising
   a. a front light-transmitting sheet,
   b. a backing sheet, and
   c. an intermediate decoratively cracked glass sheet between said front and backing sheets,
   d. said front, backing and cracked glass sheets being laminated together, forming a unitary laminate,
   e. wherein said backing sheet comprises a shock and heat retardant mineral fiberboard.

2. A decorative laminate in accordance with claim 1, wherein the front, backing and cracked glass sheets are adhesively laminated together.

3. A decorative laminate in accordance with claim 1, where the front and cracked glass sheets are laminated together by means of a light-transmitting polyvinyl butyral adhesive.

4. A decorative laminate in accordance with claim 1, wherein the front and cracked glass sheets are laminated together by means of a light-transmitting glass lamination resin adhesive.

5. A decorative laminate in accordance with claim 1, wherein the front light-transmitting sheet comprises an annealed glass sheet.

6. A decorative laminate in accordance with claim 1, wherein the cracked glass sheet comprises a cracked tempered glass sheet.

7. A decorative laminate in accordance with claim 1, wherein the cracked glass sheet comprises a cracked glass mirror.

8. A decorative laminate in accordance with claim 1, wherein the cracked glass sheet comprises a cracked, tempered glass mirror.

9. A decorative laminate in accordance with claim 1, wherein the backing sheet further comprises a mirror.

10. A decorative laminate in accordance with claim 1, wherein the backing sheet further comprises an annealed glass mirror.

11. A decorative laminate, comprising
    a. a front light-transmitting sheet,
    b. a backing sheet, and
    c. an intermediate decoratively cracked glass sheet between said front and backing sheets,
    d. said front, backing and cracked glass sheets being laminated together, forming a unitary laminate,
    e. suspension means comprising gridwork means comprising laminate supporting web means, said decorative laminate being supported by said laminate supporting web means,
    f. said backing sheet having at least one recess to receive at least a portion of said laminate supporting web means.

12. A decorative laminate, comprising
    a. a front light-transmitting sheet,
    b. a backing sheet, and
    c. an intermediate decoratively cracked glass sheet between said front and backing sheets,
    d. said front, backing and cracked glass sheets being laminated together, forming a unitary laminate,
    e. suspension means comprising gridwork means comprising laminate supporting web means, said decorative laminate being supported by said laminate supporting web means,
    f. said backing sheet having at least one recess to receive at least a portion of said laminate supporting web means, the edges of said decorative laminate being chamfered.

13. A decorative laminate, comprising
    a. a front light-transmitting sheet,
    b. a backing sheet, and
    c. an intermediate decoratively cracked glass sheet between said front and backing sheets,
    d. said front, backing and cracked glass sheets being laminated together, forming a unitary laminate,
    e. suspension means comprising gridwork means comprising laminate supporting web means, said decorative laminate being supported by said laminate supporting web means,
    f. said backing sheet having at least one recess to receive at least a portion of said laminate supporting web means, the edges of said decorative laminate being chamfered sufficiently to expose at least a portion of said laminate supporting web means to view.

* * * * *